(12) United States Patent
Matsuzawa

(10) Patent No.: US 11,403,048 B2
(45) Date of Patent: Aug. 2, 2022

(54) PRINT CONTROL DEVICE, PRINT CONTROL METHOD, AND NON-TRANSITORY COMPUTER-READABLE STORAGE MEDIUM STORING PRINT CONTROL PROGRAM WHICH CONVERTS AND GENERATES SECOND PRINTING DATA BASED ON CUSTOM SETTING VALUE

(71) Applicant: SEIKO EPSON CORPORATION, Tokyo (JP)

(72) Inventor: Tomoki Matsuzawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/235,673

(22) Filed: Apr. 20, 2021

(65) Prior Publication Data
US 2021/0334048 A1 Oct. 28, 2021

(30) Foreign Application Priority Data

Apr. 23, 2020 (JP) .............................. JP2020-076698

(51) Int. Cl.
*G06F 3/12* (2006.01)
(52) U.S. Cl.
CPC .......... *G06F 3/1205* (2013.01); *G06F 3/1247* (2013.01); *G06F 3/1253* (2013.01)
(58) Field of Classification Search
None
See application file for complete search history.

(56) References Cited

U.S. PATENT DOCUMENTS

| 9,658,806 B2 * | 5/2017 | Fallon ..................... G06F 3/129 |
| 2004/0130746 A1 * | 7/2004 | Wu ..................... H04N 1/00278 358/1.15 |
| 2009/0064198 A1 * | 3/2009 | Kobayashi ......... H04N 1/00278 719/327 |
| 2012/0050799 A1 * | 3/2012 | Towata ................... G06F 3/122 358/1.15 |

(Continued)

FOREIGN PATENT DOCUMENTS

JP 2019-175313 10/2019

OTHER PUBLICATIONS

"CUPS Plenary" issued by Michael Sweet, Apple Inc. on May 15, 2018 https://ftp.pwg.org/pub/pwg/liaison/openprinting/presentations/cups-plenary-may-18.pdf.

*Primary Examiner* — Henok Shiferaw
(74) *Attorney, Agent, or Firm* — Workman Nydegger

(57) ABSTRACT

Provided is a personal computer which is communicatively coupled to a printer, the personal computer including: an OS that has a display function of displaying a standard print setting screen, and a print function; a server section that causes the printer to be recognized by the print function of the OS, acquires standard print data (DPN) output by the print function of the OS, converts the standard print data into custom print data, and transmits the custom print data to the printer; and a custom print setting section that, when a setting for the standard print setting screen is selected, displays a second print setting screen, and that, when a custom setting value of a custom setting item is set, transmits the custom setting value to the printer, in which the server section generates the custom print data based on the custom setting value.

18 Claims, 10 Drawing Sheets

(56) References Cited

U.S. PATENT DOCUMENTS

2013/0301080 A1* 11/2013 Nakata ................ G06F 3/1204
                                                                358/1.15
2019/0294386 A1*  9/2019 Iwamoto ............... G06F 3/1292
2019/0303068 A1  10/2019 Yamada

* cited by examiner

PRINT CONTROL DEVICE, PRINT CONTROL METHOD, AND NON-TRANSITORY COMPUTER-READABLE STORAGE MEDIUM STORING PRINT CONTROL PROGRAM WHICH CONVERTS AND GENERATES SECOND PRINTING DATA BASED ON CUSTOM SETTING VALUE

The present application is based on, and claims priority from JP Application Serial Number 2020-076698, filed Apr. 23, 2020, the disclosure of which is hereby incorporated by reference herein in its entirety.

BACKGROUND

1. Technical Field

The present disclosure relates to a print control device, a print control method, and a non-transitory computer-readable storage medium storing a print control program.

2. Related Art

In the related art, there is known a technique for setting a setting value of various setting items for a printing device such as a printer without installing a printer driver.

For example, JP-A-2019-175313 discloses a program that is executable by an information processing apparatus in which an operating system having a print function is installed, the program including a management program and a print server program, where the management program registers a print server configured by the print server program as a virtual printer in the operating system.

In the configuration disclosed in JP-A-2019-175313, the management program and the print server program make it possible for the operating system to recognize a printer that does not support the print function of the operating system and to allow the printer to print. However, in the configuration disclosed in JP-A-2019-175313, since a print setting is limited to items on a print setting screen displayed by the print function of the operating system, when the printer has a specific function that cannot be set on the print setting screen displayed by the print function of the operating system, the printer's specific function cannot be supported.

SUMMARY

According to an aspect of the present disclosure, there is provided a print control device which is communicatively coupled to a printing device supporting print data in a predetermined format, the print control device including: an operating system that has a display function of displaying a first print setting screen including a plurality of setting items, and a print function; a data conversion section that causes the printing device to be recognized by the print function of the operating system, acquires first print data output by the print function of the operating system, converts the first print data into second print data which is the print data in the predetermined format different from the first print data, and transmits the second print data to the printing device; and a custom setting section that, when a setting assigned in advance for one of the plurality of setting items included in the first print setting screen is selected, displays a second print setting screen including a custom setting item different from the plurality of setting items included in the first print setting screen, and that, when a custom setting value of the custom setting item is set, transmits the set custom setting value to the printing device, in which the data conversion section generates the second print data based on the custom setting value.

According to another aspect of the present disclosure, there is provided a print control method for a print control device which is communicatively coupled to a printing device supporting print data in a predetermined format and in which an operating system having a display function of displaying a first print setting screen and a print function is installed, the print control method including: recognizing the printing device as a virtual printing device supporting first print data different from the print data in the predetermined format; displaying, by the operating system, a first print setting screen including a plurality of setting items when a print instruction is received; displaying a second print setting screen including a custom setting item different from the setting items included in the first print setting screen when the virtual printing device is selected on the first print setting screen and a setting assigned in advance for one of the plurality of setting items is selected; generating second print data which is the print data in the predetermined format based on a custom setting value of the custom setting item and a setting value set in the setting items included in the first print setting screen when the custom setting value is set; and transmitting the second print data to the printing device.

According to still another aspect of the present disclosure, there is provided a non-transitory computer-readable storage medium storing a print control program for a print control device which is communicatively coupled to a printing device supporting print data in a predetermined format and in which an operating system having a display function of displaying a first print setting screen and a print function is installed, the print control program causing a processor of the print control device to: display a second print setting screen including a custom setting item different from the setting items included in the first print setting screen when a specific setting assigned in advance for one of a plurality of setting items included in the first print setting screen is selected; and transmit, to the printing device, a custom setting value of the custom setting item related to conversion from first print data different the print data in the predetermined format into second print data which is the print data in the predetermined format and is transmitted to the printing device when the custom setting value is set.

DESCRIPTION OF EXEMPLARY EMBODIMENTS

Hereinafter, embodiments will be described with reference to the drawings.

Figure 1:
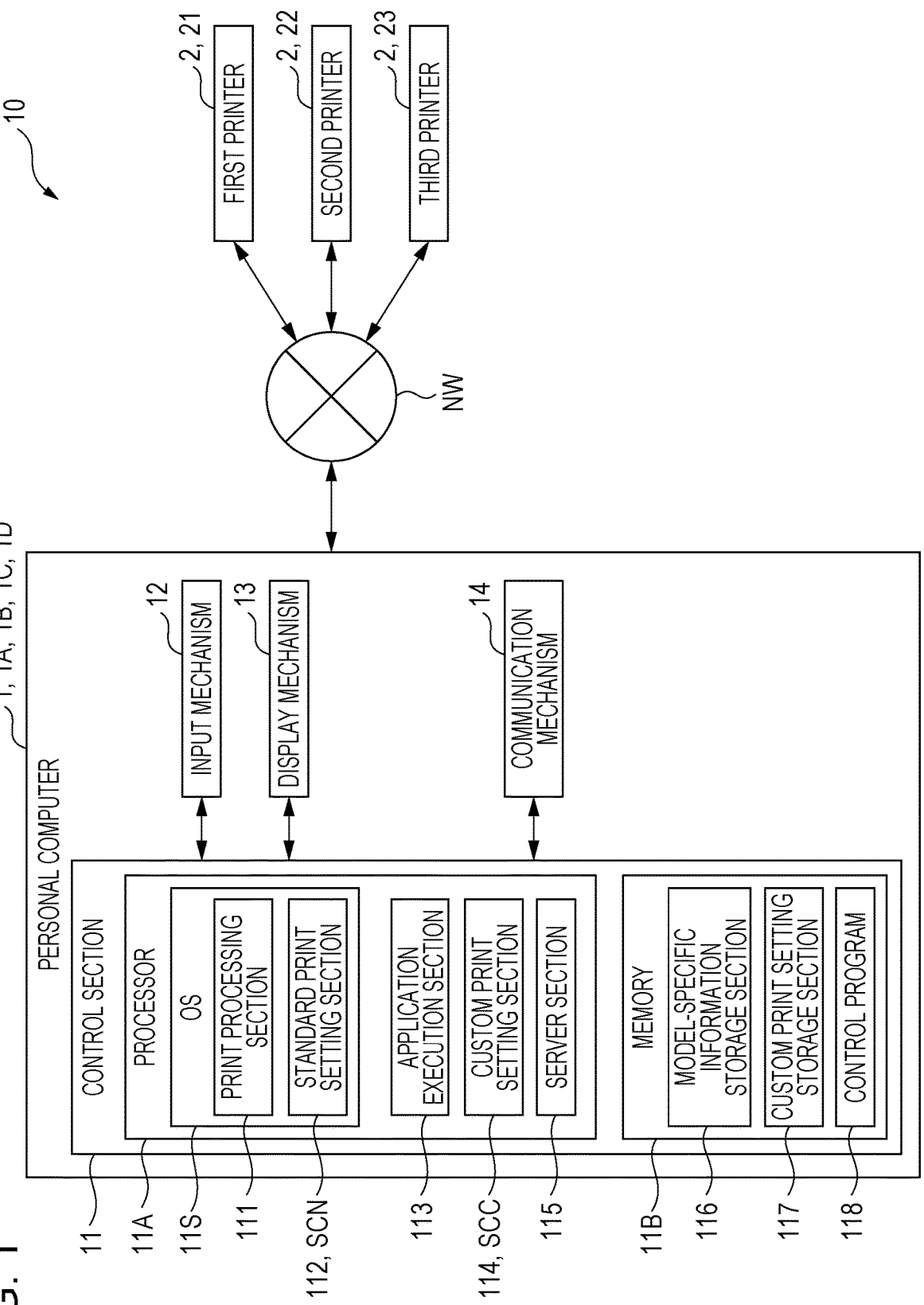
FIG. 1 is a diagram illustrating an example of a printing system including a configuration of a personal computer.

FIG. 1 is a diagram illustrating an example of a printing system 10 including a configuration of a personal computer 1.

The personal computer 1 includes a personal computer 1A according to a first embodiment to be described with reference to FIGS. 2 to 4, a personal computer 1B according to a second embodiment to be described with reference to FIGS. 5 and 6, a personal computer 1C according to a third embodiment to be described with reference to FIGS. 7 and 8, and a personal computer 1D according to a fourth embodiment to be described with reference to FIGS. 9 and 10.

The personal computer 1 is communicatively coupled to a printer 2 via a network NW. The network NW is the Internet. The personal computer 1 outputs a print instruction to the printer 2 via the network NW. The printer 2 prints an image on a recording medium such as printing paper according to the print instruction from the personal computer 1. The printer 2 includes an ink jet print head, and forms an image on a recording medium with ink ejected from the print head.

The printer 2 performs printing on a recording medium by an ink jet method, but the printer 2 may perform printing on a recording medium by adhering toner to a printing surface by an "electrophotographic method".

The network NW is the Internet, but the present disclosure is not limited thereto. The network NW may be a local area network (LAN) or a wide area network (WAN).

The printer 2 corresponds to an example of a "printing device".

The "printing device" is the printer 2, but the present disclosure is not limited thereto. The "printing device" may be a copying machine or a multifunction device having a fax function as long as it has a print function.

The printing system 10 includes a first printer 21, a second printer 22, and a third printer 23. When the first printer 21, the second printer 22, and the third printer 23 are not distinguished, each is referred to as the printer 2. Specific identification information is assigned to each of the first printer 21, the second printer 22, and the third printer 23 in advance. The specific identification information is an Internet Protocol (IP) address or a printer name.

The personal computer 1 determines the printer 2 to output the print instruction based on the specific identification information of the printer 2. The printer 2 is a printing device that does not support a print function of an OS 11S to be described later. The printer 2 is a printing device that supports print data in a predetermined format output from a printer driver to perform printing. The print data in the predetermined format is print data in an ESC/P format.

The printing system 10 includes three printers, but the present disclosure is not limited thereto.

The personal computer 1 includes a control section 11, an input mechanism 12, a display mechanism 13, and a communication mechanism 14. The personal computer 1 includes the input mechanism 12 and the display mechanism 13, but each of the input mechanism 12 and the display mechanism 13 may be separate from the personal computer 1.

The personal computer 1 corresponds to an example of a "print control device".

The control section 11 controls the operation of the personal computer 1.

The input mechanism 12 receives an input from a user, generates an input signal corresponding to the received input, and transmits the input signal to the control section 11. The input mechanism 12 is a keyboard. The input mechanism 12 separate from the personal computer 1 is a mouse.

The display mechanism 13 includes a liquid crystal display (LCD), which is a display screen, and displays various images on the LCD according to instructions from the control section 11.

The communication mechanism 14 communicates with the printer 2 via the network NW according to the instruction from the control section 11. The communication mechanism 14 communicates with the printer 2 in accordance with the Ethernet (registered trademark) standard.

The communication mechanism 14 communicates with the printer 2 in accordance with the Ethernet standard, but the present disclosure is not limited thereto. The communication mechanism 14 may communicate with the printer 2 by wireless communication such as Wi-Fi (registered trademark).

The control section 11 is a controller including a processor 11A and a memory 11B.

The memory 11B is a storage device that non-volatilely stores programs and data executed by the processor 11A. The memory 11B is composed of a magnetic storage device such as a hard disk drive (HDD), a semiconductor storage device such as a solid state drive (SSD), a semiconductor storage element such as a flash read only memory (ROM), or other types of non-volatile storage devices. The memory 11B may include a random access memory (RAM) that constitutes a work area of the processor 11A. The memory 11B stores data processed by the control section 11 and a control program 118 executed by the processor 11A.

The processor 11A executes the control program 118 on an operating system (OS) 11S. The OS 11S is a Mac (registered trademark) OS or a Linux (registered trademark) OS.

Hereinafter, a case where the OS 11S is Mac OS will be described. The personal computer 1 is manufactured by Apple Inc. The personal computer 1 is a so-called Macintosh (registered trademark).

The processor 11A may be configured by a single processor, or a plurality of processors may function as the processor 11A. The processor 11A executes the control program 118 to control the personal computer 1.

Although the processor 11A executes the control program 118 to control the personal computer 1, the control section 11 may execute processing by a function implemented in an application specific integrated circuit (ASIC), or a signal processing circuit may perform signal processing to execute the processing.

The control program 118 corresponds to an example of a "print control program".

The OS 11S includes a print processing section 111 and a standard print setting section 112.

The print processing section 111 executes the print function of the OS 11S. The print function of the OS 11S corresponds to AirPrint (registered trademark). When the standard print setting section 112 performs a standard print setting SPN, which is a setting of a plurality of setting items included in a standard print setting screen SCN, based on the print function of the OS 11S, the print processing section 111 outputs standard print data DPN. The standard print setting SPN is a setting value set by the print function of the OS 11S.

The standard print data DPN corresponds to an example of "first print data". The standard print data DPN is print data in a format different from the print data in the predetermined format supported by the printer 2. The format of the standard print data DPN is a portable document format (PDF) and a bitmap file format.

The standard print setting section 112 displays the standard print setting screen SCN on the LCD of the display mechanism 13. The standard print setting screen SCN is a screen that receives the standard print setting SPN, which is the setting of the plurality of setting items in the print function of the OS 11S, from the user. Examples of the plurality of setting items include an output printing device, the number of prints, a size of printing paper, enlargement/reduction setting, color/monochrome setting, and the like.

The standard print setting SPN corresponds to an example of a "setting of a plurality of setting items included in a first print setting screen".

The standard print setting screen SCN corresponds to an example of a "first print setting screen".

The control section 11 includes an application execution section 113, a custom print setting section 114, a server section 115, a model-specific information storage section 116, and a custom print setting storage section 117. When the processor 11A executes the control program 118, the processor 11A functions as the application execution section 113, the custom print setting section 114, and the server section 115, and the memory 11B functions as the model-specific information storage section 116 and the custom print setting storage section 117.

The model-specific information storage section 116 stores a printer name, an IP address associated with the printer name, and the like as the specific identification information of the printer 2 in association with model-specific information. The model-specific information includes information indicating a setting item of a custom print setting SPC. The custom print setting SPC indicates the print setting specific to the model of the printer 2.

The custom print setting storage section 117 stores the custom print setting SPC, which is a setting value of a custom setting item, in association with a printer name and a job name.

The custom print setting SPC corresponds to an example of a "custom setting value of a custom setting item".

The custom setting item includes a setting item for setting enabling and disabling of borderless printing.

The job name is a name given by an application program to a print job output from the application program executed by the application execution section 113 on the OS 11S.

The application execution section 113 executes an application program on the OS 11S. The application program includes WORD (registered trademark), EXCEL (registered trademark), and the like manufactured by Microsoft Corporation.

The custom print setting section 114 displays a custom print setting screen SCC including a custom setting item different from the setting items included in the standard print setting screen SCN on the LCD of the display mechanism 13. The custom print setting section 114 receives the custom print setting SPC, which is the setting value of the custom setting item included in the custom print setting screen SCC, from the user. The custom print setting section 114 outputs the received custom print setting SPC to the server section 115.

The custom print setting screen SCC corresponds to an example of a "second print setting screen".

The custom print setting section 114 corresponds to an example of a "custom setting section".

The server section 115 functions as an Internet Printing Protocol (IPP) server. The server section 115 acquires the standard print data DPN output from the print processing section 111 and converts the standard print data into custom print data DPC which is print data in a predetermined format. The server section 115 transmits the custom print setting SPC and the custom print data DPC to the printer 2.

The server section 115 has a function of causing the print processing section 111 to recognize the printer 2 that does not support the print function of the OS 11S as a virtual printer that supports the print function of the OS 11S. The server section 115 acquires model-specific information of the printer 2, replaces it with virtual printer-specific information JP, which is specific information of the virtual printer to be described later, and transmits the information to the print processing section 111. The print processing section 111 can recognize the virtual printer based on the virtual printer-specific information JP and output the standard print data DPN to the server section 115.

The custom print data DPC corresponds to an example of "second print data".

The server section 115 corresponds to an example of a "data conversion section".

The virtual printer corresponds to an example of a "virtual printing device".

Next, the personal computer 1A according to the first embodiment will be described with reference to FIGS. 2 to 4.

Figure 2:
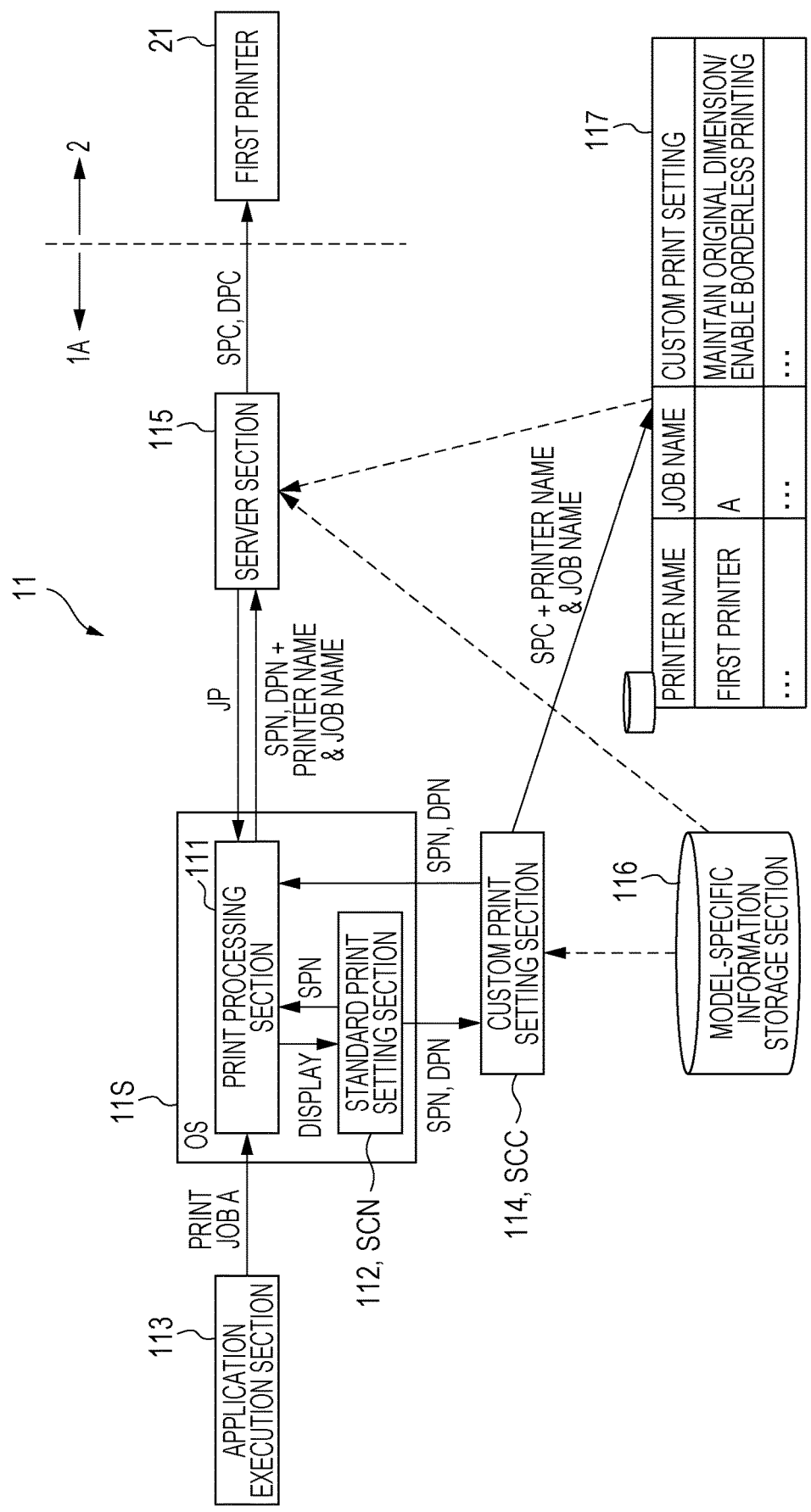
FIG. 2 is a diagram illustrating an example of a configuration of a personal computer.

FIG. 2 is a diagram illustrating an example of a configuration of the personal computer 1A according to the first embodiment.

As illustrated in FIG. 2, the custom print setting section 114 stores the custom print setting SPC, which is the custom setting value of the custom setting item included in the custom print setting screen SCC, in the custom print setting storage section 117 in association with the printer name and the job name. The server section 115 acquires the custom print setting SPC from the custom print setting storage section 117.

Figure 3:
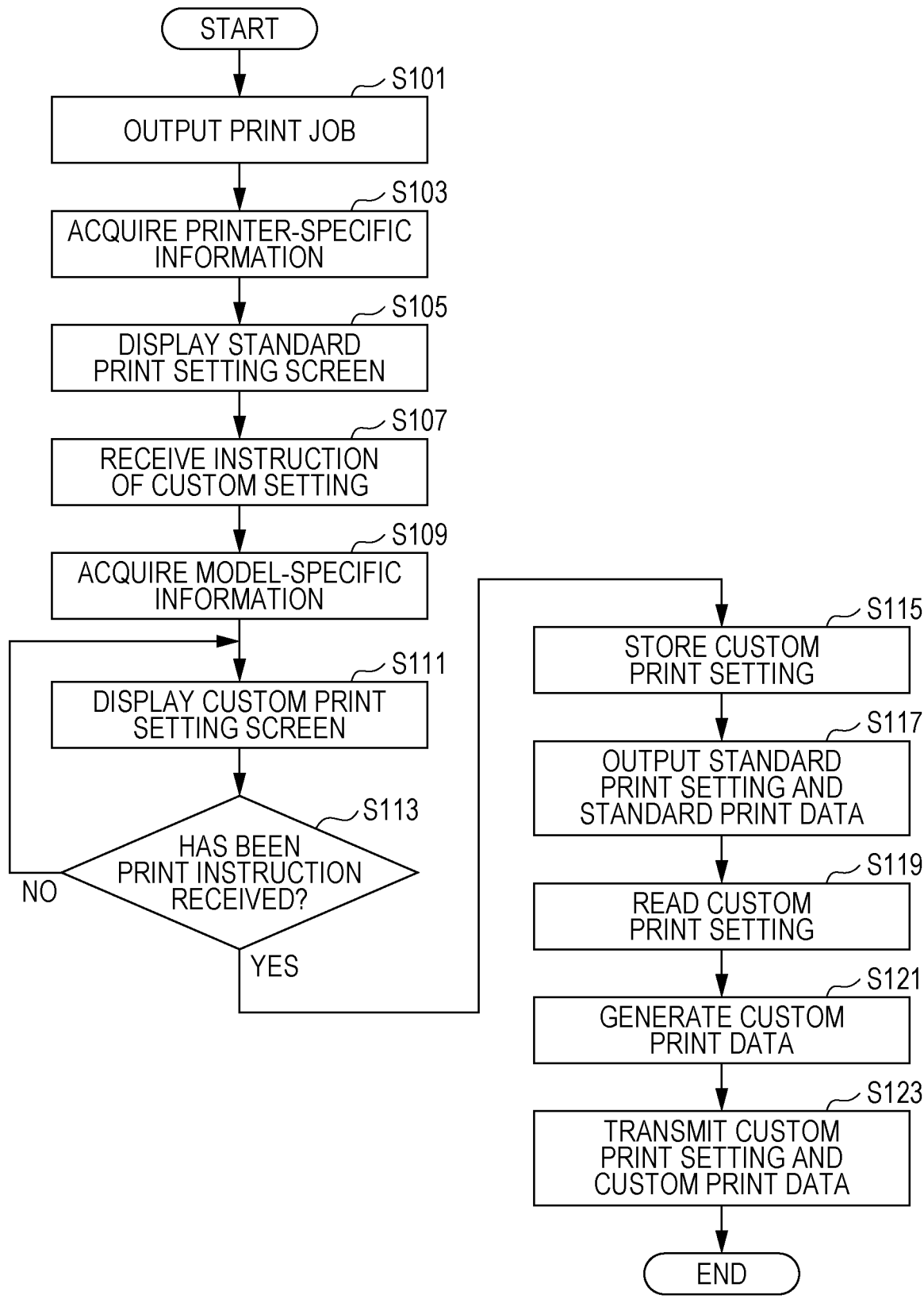
FIG. 3 is a flowchart illustrating an example of processing of a control section.

FIG. 3 is a flowchart illustrating an example of processing of the control section 11 according to the first embodiment. Hereinafter, the flowchart illustrated in FIG. 3 will be described with reference to FIG. 2.

In step S101, the application execution section 113 outputs a print job to the print processing section 111. The job name of the print job is job A.

In step S103, the standard print setting screen SCN is displayed. On the standard print setting screen SCN, the settings of the printer 2 for printing the print job is received from a user. The print processing section 111 acquires the virtual printer-specific information JP corresponding to the first printer 21 from the server section 115 in advance. The virtual printer-specific information JP corresponds to the setting item included in the standard print setting screen SCN. A virtual printer corresponding to the first printer 21 is selected as a target printer 2 for outputting the print job.

In step S105, the standard print setting section 112 displays the standard print setting screen SCN on the LCD of the display mechanism 13 based on the virtual printer-specific information JP, and receives the standard print setting SPN, that is, the setting value of the setting item included in the standard print setting screen SCN.

In step S107, the standard print setting section 112 receives an instruction to display the custom print setting screen SCC based on the input of the user to the standard print setting screen SCN.

In step S109, the custom print setting section 114 specifies a target printer 2 to be instructed to print based on the print settings included in the print job received by the print processing section 111. The custom print setting section 114 acquires model-specific information corresponding to the specified printer 2 from the model-specific information storage section 116. The printer 2 is the first printer 21.

In step S111, the custom print setting section 114 constructs the custom print setting screen SCC based on the model-specific information of the first printer 21, displays the custom print setting screen SCC on the LCD of the display mechanism 13 and receives the custom print setting SPC which is the setting value of the custom setting item.

In step S113, the custom print setting section 114 determines whether or not a print instruction has been received from the user. The print instruction corresponds to the click of a print button displayed on the custom print setting screen SCC.

When the custom print setting section 114 determines that the print instruction has not been received from the user (step S113: NO), the process returns to step S111. When the custom print setting section 114 determines that the print instruction has been received from the user (step S113: YES), the process proceeds to step S115.

In step S115, the custom print setting section 114 stores the custom print setting SPC in the custom print setting storage section 117 in association with the printer name and the job name.

In step S117, the print processing section 111 outputs the standard print setting SPN, which is a setting value of a plurality of setting items included in the standard print setting screen SCN, and the standard print data DPN to the server section 115 in association with the printer name and the job name.

In step S119, the server section 115 reads the custom print setting SPC corresponding to the printer name and the job name input in step S117 from the custom print setting storage section 117.

In step S121, the server section 115 generates the custom print data DPC by converting the standard print data DPN input in step S117 into the custom print data DPC based on the custom print setting SPC read in step S119.

In step S123, the server section 115 transmits the custom print setting SPC and the custom print data DPC to the first printer 21. After that, the process ends.

Figure 4:
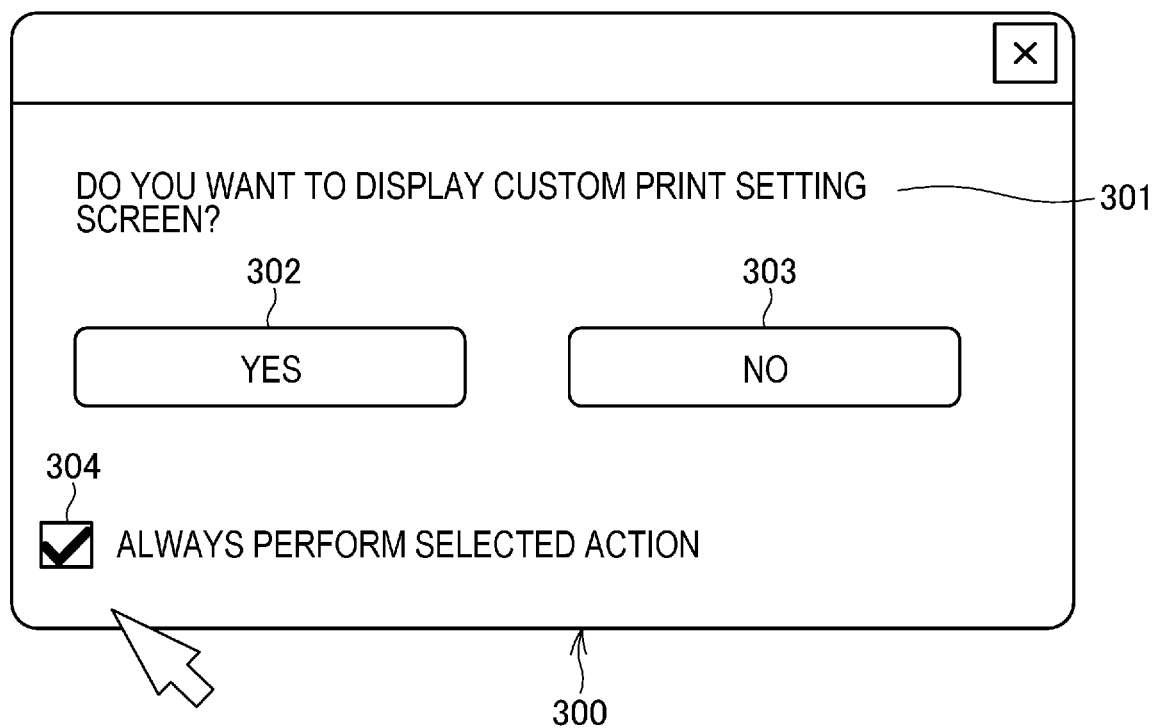
FIG. 4 is a screen view illustrating an example of a confirmation screen for confirming acceptance of a display of a custom print setting screen.

FIG. 4 is a screen view illustrating an example of a confirmation screen 300 for confirming acceptance of the display of the custom print setting screen SCC. The confirmation screen 300 is displayed on the LCD of the display mechanism 13 by the standard print setting section 112 in step S107 of FIG. 3. The reception of the display of the custom print setting screen SCC can be set in advance on the standard print setting screen SCN. One of the plurality of setting items included in the standard print setting screen SCN can be assigned in advance as a setting item for receiving the display of the custom print setting screen SCC.

The confirmation screen 300 is included in the standard print setting screen SCN.

As illustrated in FIG. 4, the confirmation screen 300 displays a guidance display section 301, a Yes button 302, a No button 303, and a check box 304.

The message "Do you want to display the custom print setting screen?" is displayed on the guidance display section 301.

The Yes button 302 is clicked by the user when the custom print setting screen SCC is displayed. When the Yes button 302 is clicked, the custom print setting section 114 displays the custom print setting screen SCC on the LCD of the display mechanism 13.

The Yes button 302 corresponds to an example of a "specific setting assigned in advance for one of a plurality of setting items included in the standard print setting screen".

The No button 303 is clicked by the user when the custom print setting screen SCC is not displayed.

The check box 304 is checked by the user when "always perform the selected action".

When the Yes button 302 is clicked while the check box 304 is checked, the custom print setting screen SCC is then displayed for the job output from the application execution section 113. When the No button 303 is clicked while the check box 304 is checked, the custom print setting screen SCC is then not displayed for the job output from the application execution section 113.

It is preferable that whether or not to display the confirmation screen 300 can be changed by a tool that changes the setting of the OS 11S based on the input from the user.

Next, the personal computer 1B according to the second embodiment will be described with reference to FIGS. 5 and 6.

Figure 5:
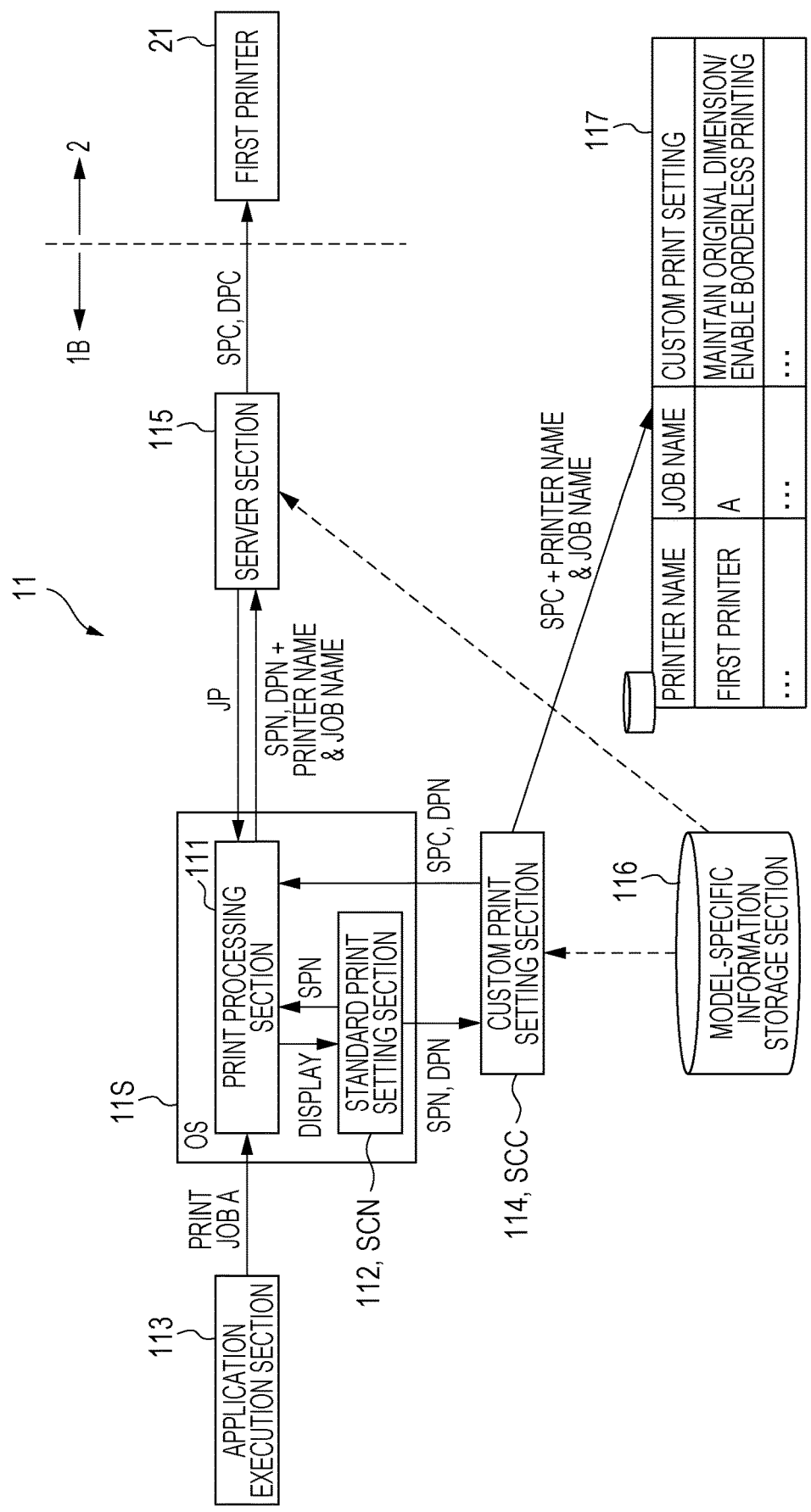
FIG. 5 is a diagram illustrating an example of a configuration of a personal computer.

FIG. 5 is a diagram illustrating an example of a configuration of the personal computer 1B according to the second embodiment.

As illustrated in FIG. 5, the custom print setting section 114 outputs the custom print setting SPC, which is the setting value of the setting item included in the custom print setting screen SCC, to the print processing section 111. The print processing section 111 outputs the standard print setting SPN, which is the setting value of the setting item included in the standard print setting screen SCN, and the custom print setting SPC to the server section 115.

The server section 115 converts the standard print data DPN into the custom print data DPC based on the custom print setting SPC.

Figure 6:
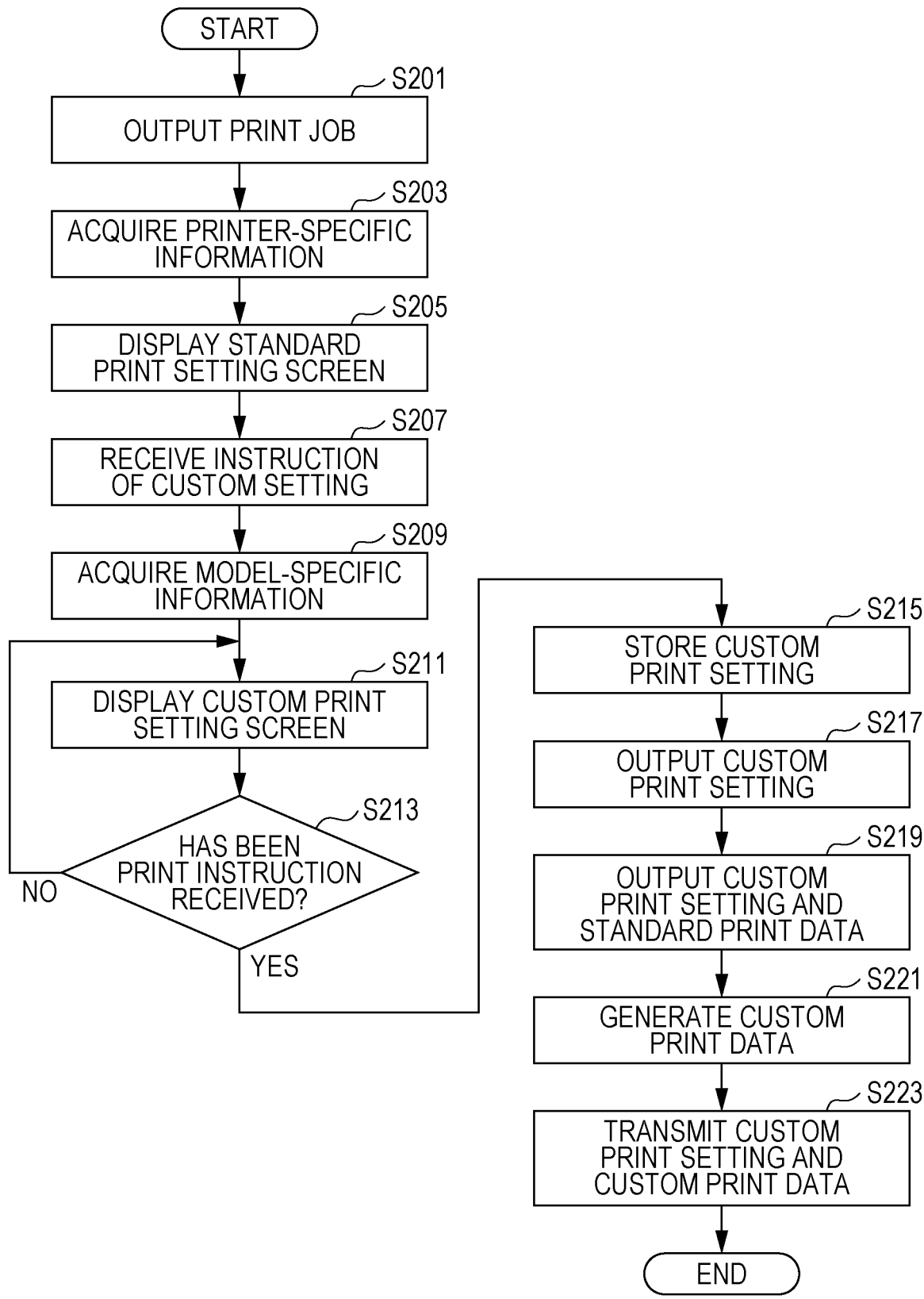
FIG. 6 is a flowchart illustrating an example of processing of a control section.

FIG. 6 is a flowchart illustrating an example of processing of the control section 11 according to the second embodiment. Hereinafter, the flowchart illustrated in FIG. 6 will be described with reference to FIG. 5.

Since each of steps S201 to S213 of the flowchart illustrated in FIG. 6 corresponds to steps S101 to S113 of the flowchart illustrated in FIG. 3, the description thereof will be omitted.

In step S215, the custom print setting section 114 stores the custom print setting SPC in the custom print setting storage section 117 in association with the printer name and the job name. The custom print setting SPC indicates a setting value of the setting item included in the custom print setting screen SCC. In step S217, the custom print setting section 114 outputs the custom print setting SPC and the standard print data DPN to the print processing section 111.

In step S219, the print processing section 111 outputs the custom print setting SPC and the standard print data DPN to the server section 115 in association with the printer name and the job name.

In step S221, the server section 115 generates the custom print data DPC by converting the standard print data DPN into the custom print data DPC based on the custom print setting SPC.

In step S223, the server section 115 transmits the custom print setting SPC and the custom print data DPC to the first printer 21. After that, the process ends.

Next, the personal computer 1C according to the third embodiment will be described with reference to FIGS. 7 and 8.

Figure 7:
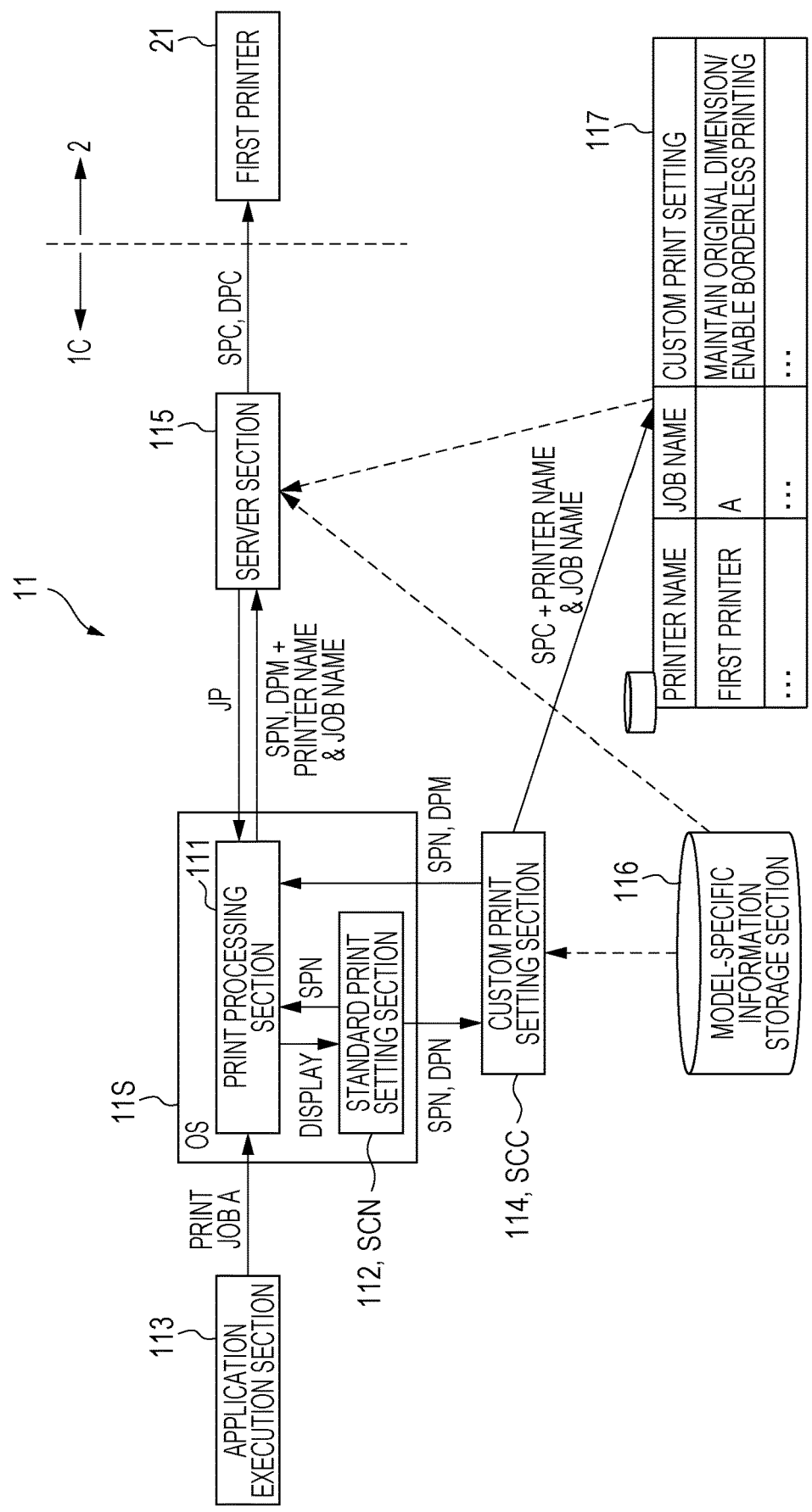
FIG. 7 is a diagram illustrating an example of a configuration of a personal computer.

FIG. 7 is a diagram illustrating an example of a configuration of the personal computer 1C according to the third embodiment.

As illustrated in FIG. 7, the custom print setting section 114 acquires the standard print data DPN from the standard print setting section 112. The custom print setting section 114 embeds the custom print setting SPC in the standard print data DPN and generates embedded print data DPM. The custom print setting section 114 outputs the embedded print data DPM to the server section 115 via the print processing section 111.

The server section 115 generates the custom print data DPC by converting the embedded print data DPM into the custom print data DPC. The server section 115 extracts the custom print setting SPC from the embedded print data DPM. The server section 115 generates the custom print data DPC from the standard print data DPN based on the custom print setting SPC.

Figure 8:
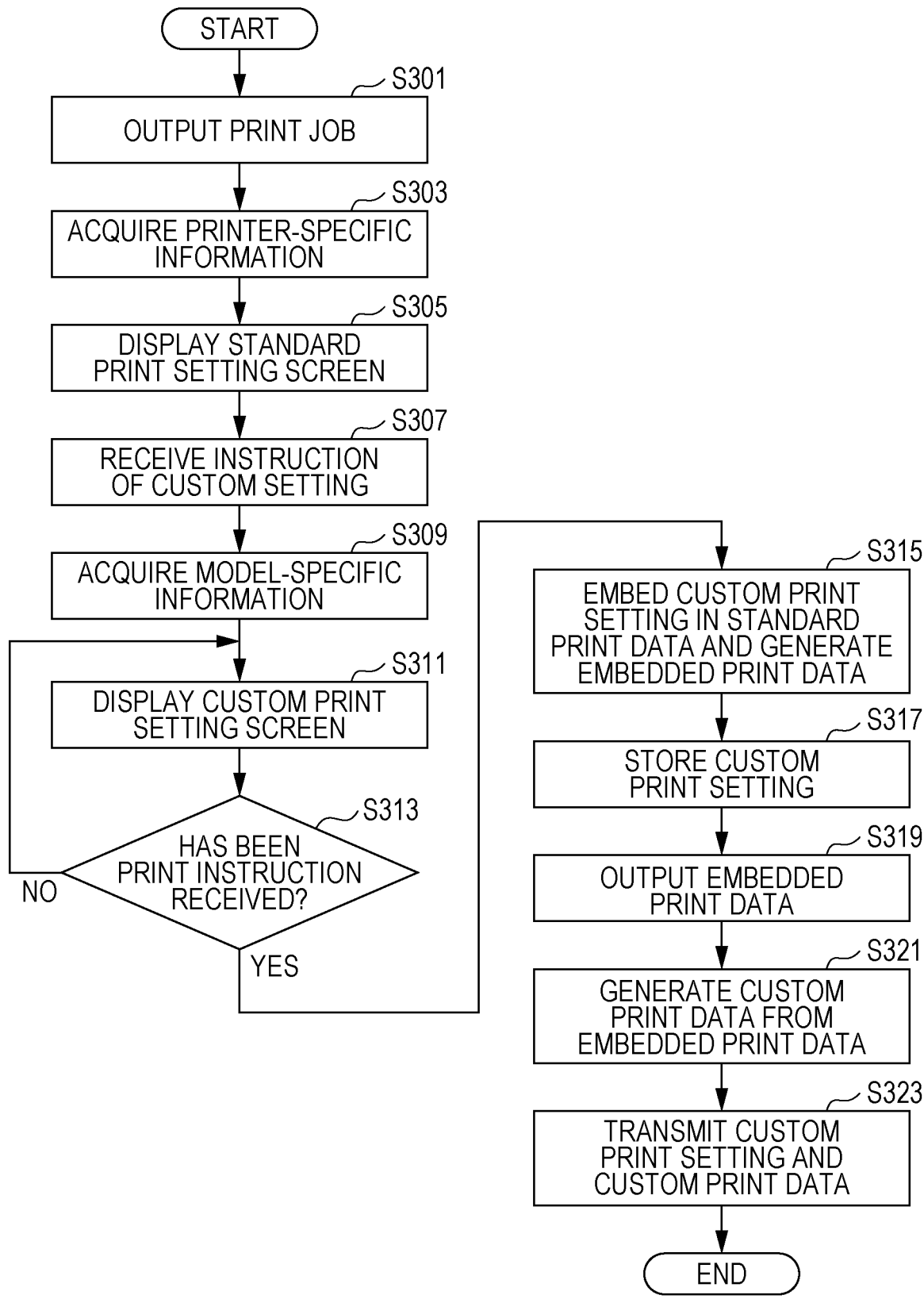
FIG. 8 is a flowchart illustrating an example of processing of a control section.

FIG. 8 is a flowchart illustrating an example of processing of the control section 11 according to the third embodiment. Hereinafter, the flowchart illustrated in FIG. 8 will be described with reference to FIG. 7.

Since each of steps S301 to S313 of the flowchart illustrated in FIG. 8 corresponds to steps S101 to S113 of the flowchart illustrated in FIG. 3, the description thereof will be omitted.

In step S315, the custom print setting section 114 acquires the standard print data DPN from the standard print setting section 112, and the custom print setting section 114 embeds the custom print setting SPC in the standard print data DPN and generates the embedded print data DPM. The custom print setting SPC indicates a setting value of the setting item included in the custom print setting screen SCC.

In step S317, the custom print setting section 114 stores the custom print setting SPC in the custom print setting storage section 117 in association with the printer name and the job name.

In step S319, the custom print setting section 114 outputs the embedded print data DPM to the print processing section 111, and the print processing section 111 outputs the standard print setting SPN, which is the setting value of the setting item included in the standard print setting screen SCN, and the embedded print data DPM to the server section 115 in association with the printer name and the job name.

In step S321, the server section 115 generates the custom print data DPC by extracting the custom print setting SPC from the embedded print data DPM and converting the standard print data DPN into the custom print data DPC.

In step S323, the server section 115 transmits the custom print setting SPC and the custom print data DPC to the first printer 21. After that, the process ends.

Next, the personal computer 1D according to the fourth embodiment will be described with reference to FIGS. 9 and 10.

Figure 9:
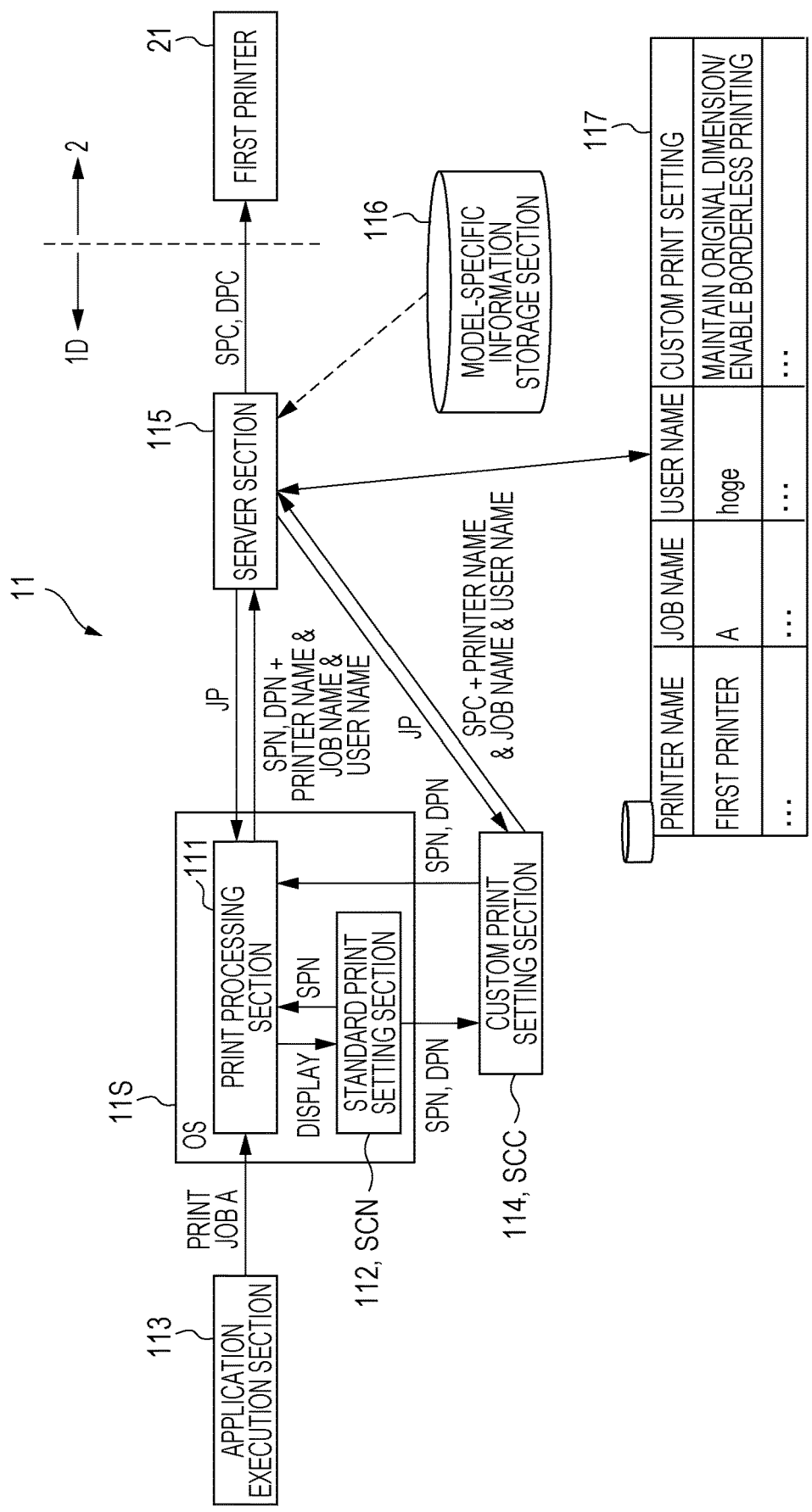
FIG. 9 is a diagram illustrating an example of a configuration of a personal computer.

FIG. 9 is a diagram illustrating an example of a configuration of the personal computer 1D according to the fourth embodiment.

As illustrated in FIG. 9, the server section 115 acquires model-specific information from the first printer 21, and the server section 115 outputs the model-specific information to the custom print setting section 114. The custom print setting section 114 determines the custom setting item included in the custom print setting screen SCC based on the model-specific information. The custom print setting section 114 determines the custom setting item included in the custom print setting screen SCC by reading the custom setting item corresponding to the model-specific information from the model-specific information storage section 116.

Figure 10:
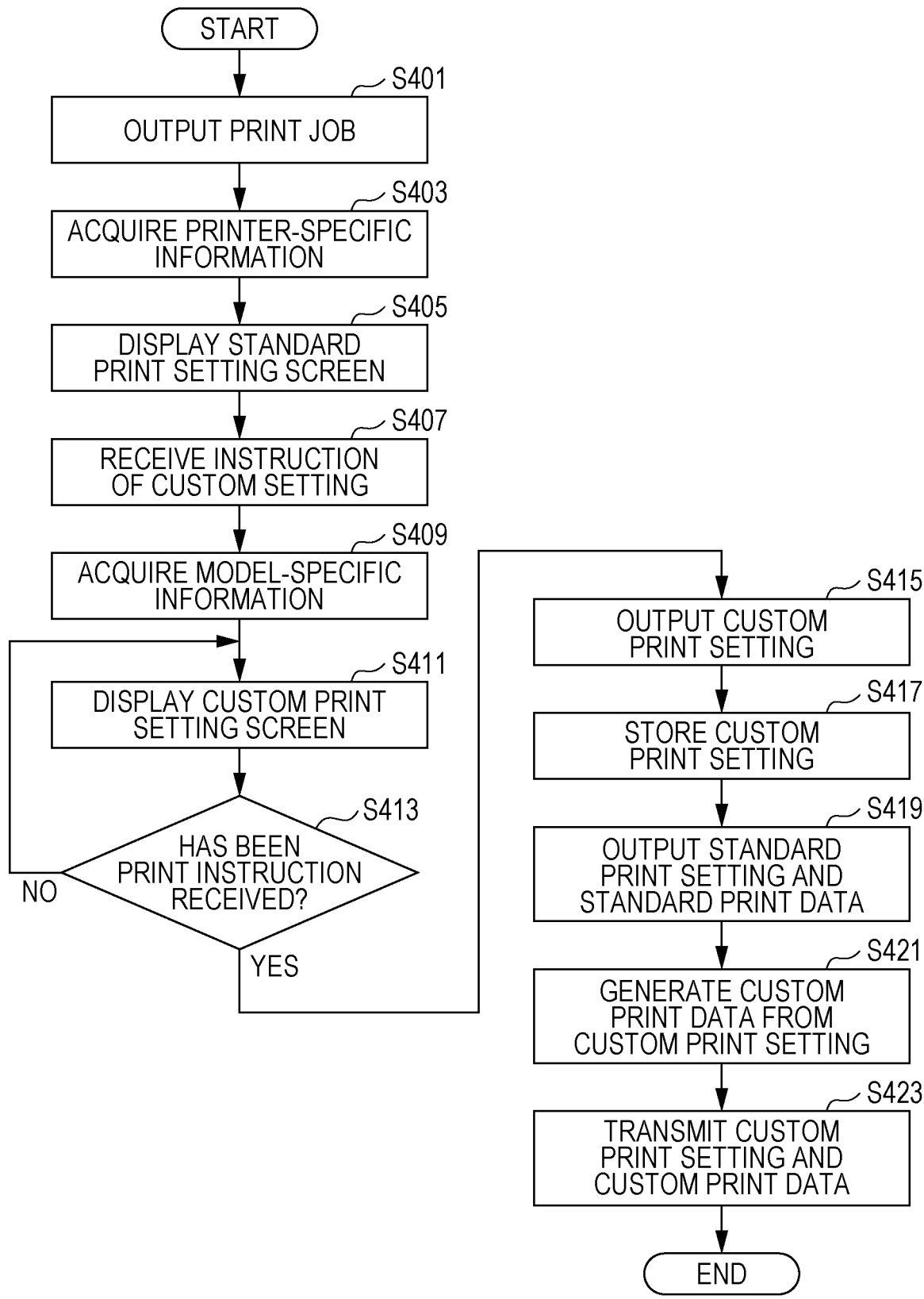
FIG. 10 is a flowchart illustrating an example of processing of a control section.

FIG. 10 is a flowchart illustrating an example of processing of the control section 11 according to the fourth embodiment. Hereinafter, the flowchart illustrated in FIG. 10 will be described with reference to FIG. 9.

Since each of steps S401 to S413 of the flowchart illustrated in FIG. 10 corresponds to steps S101 to S113 of the flowchart illustrated in FIG. 3, the description thereof will be omitted.

In step S415, the custom print setting section 114 outputs the custom print setting SPC to the server section 115. The custom print setting SPC indicates a setting value of the setting item included in the custom print setting screen SCC.

In step S417, the custom print setting section 114 stores the custom print setting SPC in the custom print setting storage section 117 in association with the printer name and the job name.

In step S419, the custom print setting section 114 outputs the standard print setting SPN, which is the setting value of the setting item included in the standard print setting screen SCN, and the standard print data DPN to the server section 115 via the print processing section 111.

In step S421, the server section 115 generates the custom print data DPC by converting the standard print data DPN into the custom print data DPC based on the custom print setting SPC.

In step S423, the server section 115 transmits the custom print setting SPC and the custom print data DPC to the first printer 21. After that, the process ends.

As described above, the personal computer 1 which is communicatively coupled to the printer 2 supporting print data in a predetermined format includes the OS 11S that has a display function of displaying a standard print setting screen SCN including a plurality of setting items, and a print function. The personal computer 1 includes the server section 115 that causes the printer 2 to be recognized by the print function of the OS 11S, acquires the standard print data DPN output by the print function of the OS 11S, converts the standard print data into the custom print data DPC which is the print data in the predetermined format different from the standard print data DPN, and transmits the custom print data DPC to the printer 2. The personal computer 1 includes the custom print setting section 114 that, when a setting assigned in advance for one of the plurality of setting items included in the standard print setting screen SCN is selected, displays a custom print setting screen SCC including a custom setting item different from the setting items included in the standard print setting screen SCN, and that, when a custom print setting SPC, which is a custom setting value of the custom setting item, is set, transmits the custom print setting SPC to the printer 2. The server section 115 generates the custom print data DPC based on the custom print setting SPC.

Since the server section 115 generates the custom print data DPC based on the custom print setting SPC, the custom print data DPC that reflects the custom print setting SPC can be generated. When the printer 2 has a specific function that cannot be set on the standard print setting screen SCN, it can support the specific function of the printer 2.

The custom print setting section 114 outputs the custom print setting SPC to the OS 11S, and the OS 11S outputs the standard print setting SPN and the custom print setting SPC to the server section 115.

Since the OS 11S outputs the standard print setting SPN and the custom print setting SPC to the server section 115, the server section 115 can generate the custom print data DPC that reflects the custom print setting SPC. When the printer 2 has a specific function that cannot be set on the standard print setting screen SCN, it can support the specific function of the printer 2.

The custom print setting section 114 stores the custom print setting SPC, and the server section 115 acquires the custom print setting SPC stored in the custom print setting section 114.

Since the server section 115 acquires the custom print setting SPC stored in the custom print setting section 114, the server section 115 can generate the custom print data DPC that reflects the custom print setting SPC. When the printer 2 has a specific function that cannot be set on the standard print setting screen SCN, it can support the specific function of the printer 2.

The custom print setting section 114 acquires the standard print data DPN, embeds the custom print setting SPC in the standard print data DPN, and outputs the embedded print data to the server section 115.

Since the custom print setting section 114 acquires the standard print data DPN, embeds the custom print setting SPC in the standard print data DPN, and outputs the embedded print data to the server section 115, the server section 115 can extract the custom print setting SPC. The server section 115 can generate the custom print data DPC that reflects the custom print setting SPC. When the printer 2 has a specific function that cannot be set on the standard print setting screen SCN, it can support the specific function of the printer 2.

The server section 115 acquires model-specific information from the printer 2 and transmits the model-specific information to the custom print setting section 114.

Since the server section 115 acquires model-specific information from the printer 2 and transmits the model-specific information to the custom print setting section 114, the custom print setting section 114 can determine the custom setting item based on the model-specific information. The custom print setting section 114 can receive the setting value of the custom setting item.

The custom print setting section 114 determines the custom setting item to be displayed on the custom print setting screen SCC based on the received model-specific information.

Since the custom print setting section 114 determines the custom setting item to be displayed on the custom print setting screen SCC based on the received model-specific information, the custom print setting section 114 can receive the setting value of the custom setting item.

The custom setting item includes a setting item for setting enabling and disabling of borderless printing.

Since the custom setting item includes the setting item for setting enabling and disabling of borderless printing, the user can set enabling and disabling of borderless printing. User convenience can be improved.

In a print control method for the personal computer 1 which is communicatively coupled to the printer 2 supporting print data in a predetermined format and in which the OS 11S having a function of displaying a standard print setting screen SCN and a print function is installed, the printer 2 is recognized as a virtual printer supporting standard print data DPN different from the print data in the predetermined format. When a print instruction is received, the OS 11S displays the standard print setting screen SCN including a plurality of setting items, and when the virtual printer is selected on the standard print setting screen SCN and a setting assigned in advance for one of the plurality of setting items is selected, a custom print setting screen SCC including a custom setting item different from the setting items included in the standard print setting screen SCN is displayed. When the custom print setting SPC, which is the custom setting value of the custom setting item, is set, the custom print data DPC which is the print data in the predetermined format is generated, and the custom print data DPC is transmitted to the printer 2, based on the custom print setting SPC and the standard print setting SPN, which is the setting value set in the setting item included in the standard print setting screen SCN.

Since the custom print data DPC is generated based on the custom print setting SPC, the custom print data DPC that reflects the custom print setting SPC can be generated. When the printer 2 has a specific function that cannot be set on the standard print setting screen SCN, it can support the specific function of the printer 2.

Model-specific information of the printer 2 is acquired, and the custom setting item to be displayed on the custom print setting screen SCC is determined based on the model-specific information.

Since the model-specific information is acquired from the printer 2 and the custom setting item to be displayed on the custom print setting screen SCC is determined, the custom setting value can be received.

The personal computer 1 is communicatively coupled to the printer 2 supporting the print data in a predetermined format and the OS 11S having a function of displaying the standard print setting screen SCN and a print function is installed in the personal computer. When a specific setting assigned in advance for one of a plurality of setting items included in the standard print setting screen SCN is selected, the processor 11A of the personal computer 1 executes a function of displaying the custom print setting screen SCC including a custom setting item different from the setting items included in the standard print setting screen SCN. When a custom print setting SPC, which is the custom setting value of the custom setting item, is set, the processor executes a function of transmitting, to the printer 2, the custom print setting SPC related to conversion from standard print data DPN different the print data in the predetermined format into custom print data DPC which is the print data in the predetermined format and is transmitted to the printer 2.

Since the custom print setting SPC is transmitted to the printer 2, the custom print data DPC that reflects the custom print setting SPC can be generated. When the printer 2 has a specific function that cannot be set on the standard print setting screen SCN, it can support the specific function of the printer 2.

The present application is not limited to the above-described embodiments, that is, the configurations of the first embodiment to the fourth embodiment, and can be implemented in various modes without departing from the gist thereof.

The input mechanism 12 is a keyboard, but the present disclosure is not limited thereto. The input mechanism 12 may receive an input from a user, generate an input signal corresponding to the received input, and transmit the input signal to the control section 11. The input mechanism 12 may be a touch panel or a mouse.

At least some of the functional blocks illustrated in FIG. 1 may be realized by hardware, or may be configured to be realized by hardware and software, and the present disclosure is not limited to a configuration in which independent hardware resources are arranged as illustrated in the drawing.

The control program 118 executed by the processor 11A of the control section 11 of the personal computer 1 is stored in the memory 11B, but the control program 118 may be stored in the HDD or the like.

The processing units of the flowcharts illustrated in FIGS. 3, 6, 8, and 10 are divided according to the main processing contents in order to facilitate understanding of the processing of each control section 11 of the personal computer 1A to the personal computer 1D. The embodiment is not limited by the method of dividing the processing units and the names illustrated in the flowcharts illustrated in FIGS. 3, 6, 8, and 10. The processing of the control section 11 can be divided into more processing units according to the processing content, or can be divided so that one processing unit includes more processing. Also, the processing order of the above flowchart is not limited to the illustrated example.

The print control method for the personal computer 1 can be realized by causing the processor 11A of the control section 11 of the personal computer 1 to execute the control program 118 according to the print control method for the personal computer 1. The control program 118 can also be recorded on a recording medium that is readable by a computer. As the recording medium, a magnetic or optical recording medium or a semiconductor memory device can be used. Examples of the recording medium include a portable or fixed recording medium such as a flexible disk, a compact disk read only memory (CD-ROM), a digital versatile disc (DVD), Blu-ray (registered trademark) disc, a magneto-optical disk, a flash memory, and a card type recording medium. The recording medium may be a non-volatile storage device such as RAM, ROM, or HDD, which is an internal storage device included in the personal computer 1. It is also possible to realize the print control method for the personal computer 1 by storing the control program 118 according to the print control method for the personal computer 1 in a server device or the like and downloading the control program 118 from the server device to the personal computer 1.

What is claimed is:

1. A print control device which is communicatively coupled to a printing device supporting print data in a predetermined format, the print control device comprising:
    an operating system that has a display function of displaying a first print setting screen including a plurality of setting items, and a print function;
    a data conversion section that causes the printing device to be recognized by the print function of the operating system, acquires first print data output by the print function of the operating system, converts the first print data into second print data which is the print data in the predetermined format different from the first print data, and transmits the second print data to the printing device; and
    a custom setting section that, when a setting assigned in advance for one of the plurality of setting items included in the first print setting screen is selected, displays a second print setting screen including a custom setting item different from the plurality of setting items included in the first print setting screen, and that, when a custom setting value of the custom setting item is set, transmits the set custom setting value to the printing device,
    wherein the data conversion section generates the second print data based on the custom setting value.

2. The print control device according to claim 1, wherein the custom setting section outputs the custom setting value to the operating system, and
    the operating system outputs a setting value set on the first print setting screen and the custom setting value to the data conversion section.

3. The print control device according to claim 1, wherein the custom setting section stores the custom setting value, and
    the data conversion section acquires the custom setting value stored in the custom setting section.

4. The print control device according to claim 1, wherein the custom setting section acquires the first print data, embeds the custom setting value in the first print data, and outputs embedded print data to the data conversion section.

5. The print control device according to claim 1, wherein the data conversion section acquires model-specific information from the printing device and transmits the model-specific information to the custom setting section.

6. The print control device according to claim 5, wherein the custom setting section determines the custom setting item to be displayed on the second print setting screen based on the received model-specific information.

7. The print control device according to claim 1, wherein the custom setting item includes a setting item for setting enabling and disabling of borderless printing.

8. A print control method for a print control device which is communicatively coupled to a printing device supporting print data in a predetermined format and in which an operating system having a display function of displaying a first print setting screen and a print function is installed, the print control method comprising:
    recognizing the printing device as a virtual printing device supporting first print data different from the print data in the predetermined format;
    displaying, by the operating system, a first print setting screen including a plurality of setting items when a print instruction is received;
    displaying a second print setting screen including a custom setting item different from the setting items included in the first print setting screen when the virtual printing device is selected on the first print setting screen and a setting assigned in advance for one of the plurality of setting items is selected;
    generating second print data which is the print data in the predetermined format based on a custom setting value of the custom setting item and a setting value set in the setting items included in the first print setting screen when the custom setting value is set; and
    transmitting the second print data to the printing device.

9. The print control method according to claim 8, further comprising:
    outputting the custom setting value to the operating system,
    wherein the operating system outputs the setting value set on the first print setting screen and the custom setting value.

10. The print control method according to claim 8, further comprising:
    storing the custom setting value; and
    generating the second print data based on the stored custom setting value.

11. The print control method according to claim 8, further comprising: acquiring the first print data and embedding the custom setting value in the first print data to output embedded print data.

12. The print control method according to claim 8, further comprising: acquiring model-specific information from the printing device.

13. The print control method according to claim 12, further comprising: determining the custom setting item to be displayed on the second print setting screen based on the acquired model-specific information.

14. The print control method according to claim 8, wherein the custom setting item includes a setting item for setting enabling and disabling of borderless printing.

15. A non-transitory computer-readable storage medium storing a print control program for a print control device which is communicatively coupled to a printing device supporting print data in a predetermined format and in which an operating system having a display function of displaying a first print setting screen and a print function is installed, the print control program causing a processor of the print control device to:

display a second print setting screen including a custom setting item different from a plurality of setting items included in the first print setting screen when a specific setting assigned in advance for one of the setting items included in the first print setting screen is selected; and transmit, to the printing device, a custom setting value of the custom setting item related to conversion from first print data different the print data in the predetermined format into second print data which is the print data in the predetermined format and is transmitted to the printing device when the custom setting value is set.

16. The non-transitory computer-readable storage medium according to claim 15, wherein the processor is further caused to acquire model-specific information from the printing device.

17. The non-transitory computer-readable storage medium according to claim 16, wherein the processor is further caused to determine the custom setting item to be displayed on the second print setting screen based on the acquired model-specific information.

18. The non-transitory computer-readable storage medium according to claim 15, wherein the custom setting item includes a setting item for setting enabling and disabling of borderless printing.

* * * * *